United States Patent [19]

Nilson et al.

[11] 3,800,326

[45] Mar. 26, 1974

[54] COMPUTER SYSTEM DISC DRIVE ACCESS STRUCTURE

[75] Inventors: Jay Brent Nilson; Earl N. Bailey, both of San Jose, Calif.

[73] Assignee: Memorex Corporation, Santa Clara, Calif.

[22] Filed: Sept. 20, 1972

[21] Appl. No.: 290,758

[52] U.S. Cl. ................ 360/98, 206/62 P, 346/137

[51] Int. Cl. ............................................ G11b 1/02

[58] Field of Search ............ 206/62 P; 340/174.1 C; 179/100.2 Z; 346/137, 74 MD; 274/2, 41.4 M

[56] References Cited

UNITED STATES PATENTS

| | | | |
|---|---|---|---|
| 3,666,977 | 5/1972 | Helms et al. | 340/174.1 C |
| 3,577,133 | 5/1971 | Gartein | 340/174.1 C |

*Primary Examiner*—Vincent P. Canney
*Attorney, Agent, or Firm*—Limbach, Limbach & Sutton

[57] ABSTRACT

A cabinet for a disc drive includes a base structure containing a disc pack drive mechanical mechanism and an electronic assembly on the top of the base structure containing the electronic logic circuitry with flexible cables interconnecting the electronic assembly with the base structure. The elctronic assembly is slidable over the top of the base structure to expose an opening to permit access for maintenance. Normally covered slots are provided in the top of the base structure for the interconnecting cables to pass as the electronic assembly is pushed forward on the base structure to expose the access opening. The covers on these slots are moved out of the way as the electronic assembly is moved forward. A magnetic disk pack receptacle within the base structure has an opening in its top which is covered by a flat cover having rollers that ride on tracks attached to the top of the base structure.

13 Claims, 8 Drawing Figures

COMPUTER SYSTEM DISC DRIVE ACCESS STRUCTURE

BACKGROUND OF THE INVENTION

The various aspects of the present invention relate generally to cabinets providing access to the interior thereof, and, more particularly to such cabinets especially adapted for a magnetic disc drive machine.

Present electronic computing systems include as primary components a central processing unit and a plurality of peripheral magnetic disc storage units connected therewith. The disc storage units act as an auxiliary memory for the central electronic processer. Each disc storage unit includes a removable disc pack having a plurality of concentric magnetic discs as a single structure with enough space between the discs to permit insertion of magnetic read/write heads. A disc pack is removably held by a disc drive that rotates the disc pack at a high speed. A plurality of arms, each having a magnetic read/write head held thereon, fit between the discs of a disc pack and are moved between various circular tracks thereof (cylinders) by precision electromechanical control mechanisms within the disc drive. Such disc drives are complicated pieces of electronic and mechanical components that must operate with a high degree of precision. Periodic adjustment of the controlling mechanism of the read/write head and other electromechanical elements is required to maintain high precision performance. Testing of the electronic elements within the disc drive is also periodically desirable.

Therefore, it is a primary object of the present invention to provide a computer disc drive that has easy access for maintenance of electronic and electromechanical elements therein.

It is another object of the present invention to provide an improved sliding top assembly for covering a disc drive receptacle that receives a disc pack.

SUMMARY OF THE INVENTION

Briefly, according to one aspect of the invention, a disc pack is provided with a base structure having an opening near its forward edge for inserting and removing a magnetic disc pack. A flat cover is provided for this opening having two rollers on each side. A pair of tracks are provided on either side of the opening of the base structure and extend generally between its front and rear. One track of each pair has a detent into which a roller may drop positioned adjacent the front of the disc pack opening. The other track of each pair has a detent adjacent the rear of the disc pack opening. The associated rollers on the cover are positioned so that they drop into their respective detents simultaneously, thereby to cause the underside of the cover to drop onto the top of the base structure in a parallel relationship therewith. This assures a good seal of the cover with the base structure which is desirable to keep out dust and other foreign particles from within the disc pack receptacle. One track is employed exclusively for each roller on the cover so that there are no extra detents through which a roller may pass and this provides smooth operation of the cover and also prevents the cover from sealing onto the top of the base structure at some position other than the desired position that covers the disc pack receptacle opening.

According to another aspect of the present invention, top access is provided into the base structure of the disc drive through an opening in the top surface thereof at its rear behind the disc pack receptacle opening. Ball bearing tracks support an electronic assembly extending upward from the top surface of the base structure. The electronic assembly is normally positioned at the rear of the base structure to cover the access opening and to permit access to the disc pack but the electronic assembly is movable to the front of the base structure to expose the access opening to provide access to components within the base structure. The electronic assembly includes logic circuitry with various test points exposed for easy access from the rear of the electronic assembly. The rear panel of the electronic assembly is hinged in a manner that it may be opened and laid on the top of the electronic assembly. The front panel containing operating switches and visual indicators is hinged at its top to the electronic assembly so that it may be tilted upwards to make the front panel indicators visible from the rear of the base structure, thereby to permit maintenance from the rear of the base structure with a full view of the lights and other indicators normally visible only from the front of the electronic assembly.

According to still another aspect of the present invention, cables interconnecting the electronic assembly and the components within the base structure move with the assembly in a slot provided in the top surface of the base structure. This slot is normally covered by spring loaded hinged deck panel but a cam surface is provided on the bottom of the electronic assembly for automatically depressing the deck panel out of the way to open up the slot to permit the cables to pass therealong. The deck panel located adjacent the front of the base structure may thereby be moved out of the way as the electronic assembly is moved forward from the rear of the base structure.

Various other features of the disc drive access structure according to other aspects of the present invention are described in the following detailed description in which various additional objects and advantages of all the aspects of the present invention are also described.

DESCRIPTION OF THE PREFERRED EMBODIMENTS

Figure 1:
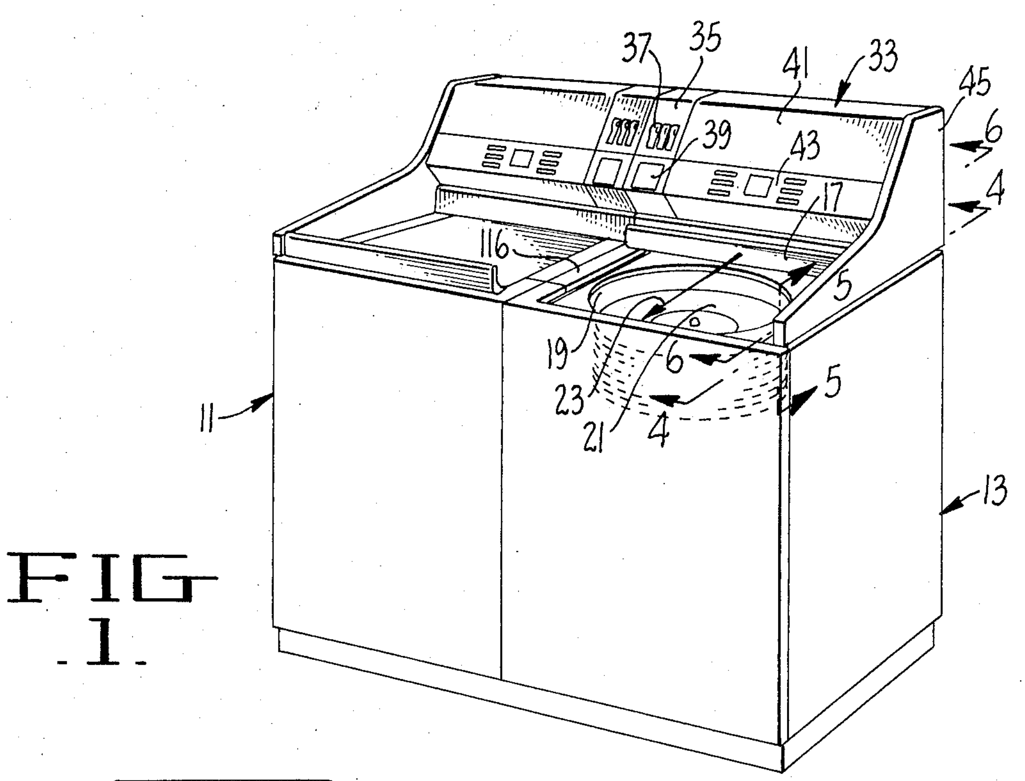
FIG. 1 is a front view of a disc drive module including two disc drive spindles.

Referring to FIG. 1, a module including two disc drive spindles 11 and 13 share certain power supply and other components. Insofar as the cabinet of the disc drive module is concerned, the cabinet and access structure of the disc drive spindle 11 is substantially a mirror image of that of disc drive spindle 13. Therefore, the cabinet and access structure of only disc drive 13 is described in detail hereinafter.

The disc drive 13 of FIG. 1 is shown with the various access structures of its cabinet in a closed position ready for operation of the disc pack except for a flat glass cover 15 (not shown in FIG. 1) having a handle 17 attached to its leading edge. The cover of the disc drive 13 is shown pushed toward its rear edge to expose an opening 19 to a receptacle 21 extending downward from the top of the disc drive 13 for receiving a magnetic disc pack 23.

Figure 2:
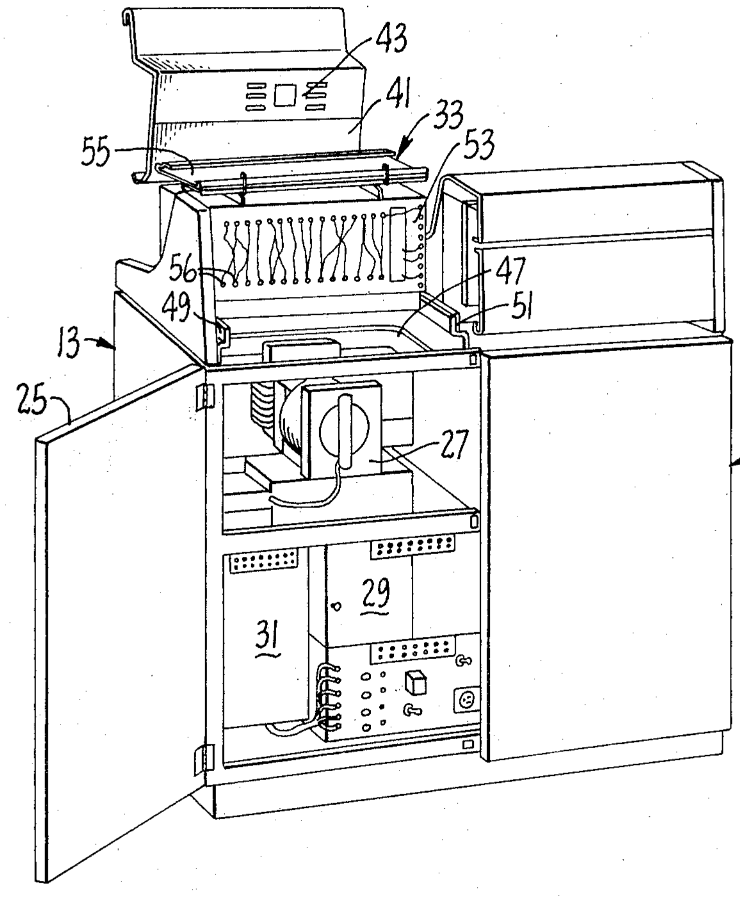
FIG. 2 is a rear view of the module of FIG. 1 with certain covers open.

The base structure of the disc drive 13 contains a motor (not shown) for driving the disc pack 23. The view of the disc drive 13 of FIG. 2 shows a back cover 25 thereof in an open position to expose an activator assembly 27 within the base structure. The activator assembly 27 controls the position of magnetic read/-write heads (not shown) by mechanical connection therewith through a plurality of arms that are extendable into the disc pack receptacle 21. The activator assembly 27 must be adjusted from time to time to maintain precision control of the magnetic read/write heads with respect to the various cylinders or tracks on the magnetic discs of a disc pack 23 that is removably held within the receptacle 21. The base structure also contains a d.c. power supply 29 and a servo power amplifier assembly 31. Various other components necessary to operation of the disc drive are not shown in the Figures since they are not necessary for an understanding of the cabinet access structure.

Referring again to FIG. 1, an electronic assembly 33 is carried above the top surface of the base structure of the disc drive 13. A front panel portion 35 contains operating switches 37 and an address plug 39. Another portion 41 of the front panel of the electronic assembly 33 contains various indicator lights 43 and appropriate switching so that the operation of the disc drive 13 may be monitored as desired. A rigid side piece 45 connected to the base structure of the disc pack 13 is provided at one end of the electronic assembly 33.

In order to provide proper access to the activator assembly 27 within the base structure of the disc drive 13, an access opening 47 is provided in the top surface of the bottom structure of the disc drive, as shown in FIG. 2. The electronic assembly 33 has a normal position to the rear of the disc drive 13 which covers this opening 47 when the disc drive in in operation. However, when maintenance or adjustments are being made to components within the base structure of the disc drive such as the activator 27, the electronic assembly 33 is slid forward to its dashed position of FIG. 2 on tracks 49 and 51.

Referring again to FIG. 2, a printed circuit board connector assembly 53 is positioned within the electronic assembly 33 in substantially a vertical position to expose connector pins such as pins 56 to the rear of the machine for easy access. The pins such as pins 56 are electrical test points to which a maintenance person may connect test equipment while making adjustments to the disc drive. On the opposite side of the connector assembly 53 are the various printed circuit boards (not shown) that are necessary to provide control and signal processing functions.

In order to provide easy access to the electronic assembly 33, its rear panel 55 is adapted to be folded up and laid on top of the electronic assembly 33 to make the rear of the connector assembly 53 easily accessible. As can best be seen from FIG. 6, the rear panel 55 is attached to the electronic assembly 33 at its top by a hinge connection 57 which permits pivoting the rear panel 33 up and out of the way of the connector assembly 53. In order not to obstruct the view of the raised front panel 41 from a maintenance person working from the rear of the disc drive 13, a second hinge 59 is provided in the middle of the rear panel 55 so that it may be folded back on itself and set on top of the electronic assembly 33 in a manner shown in FIGS. 2 and 6. The front panel portion 41 of the electronic assembly 33 is also hinged at its top by a hinge 61 (FIG. 6) to permit the front panel to be tilted upward and thus to make its indicators 43 visible to a maintenance person working from the rear of the disc drive. The double folding rear panel 55 of the electronic assembly 33 does not provide any visual obstruction to a maintenance person while viewing the front panel indicators 43 when the front panel 41 is in the position shown in FIG. 2 and in the dotted position of FIG. 6.

Figures 3, 4, 5:
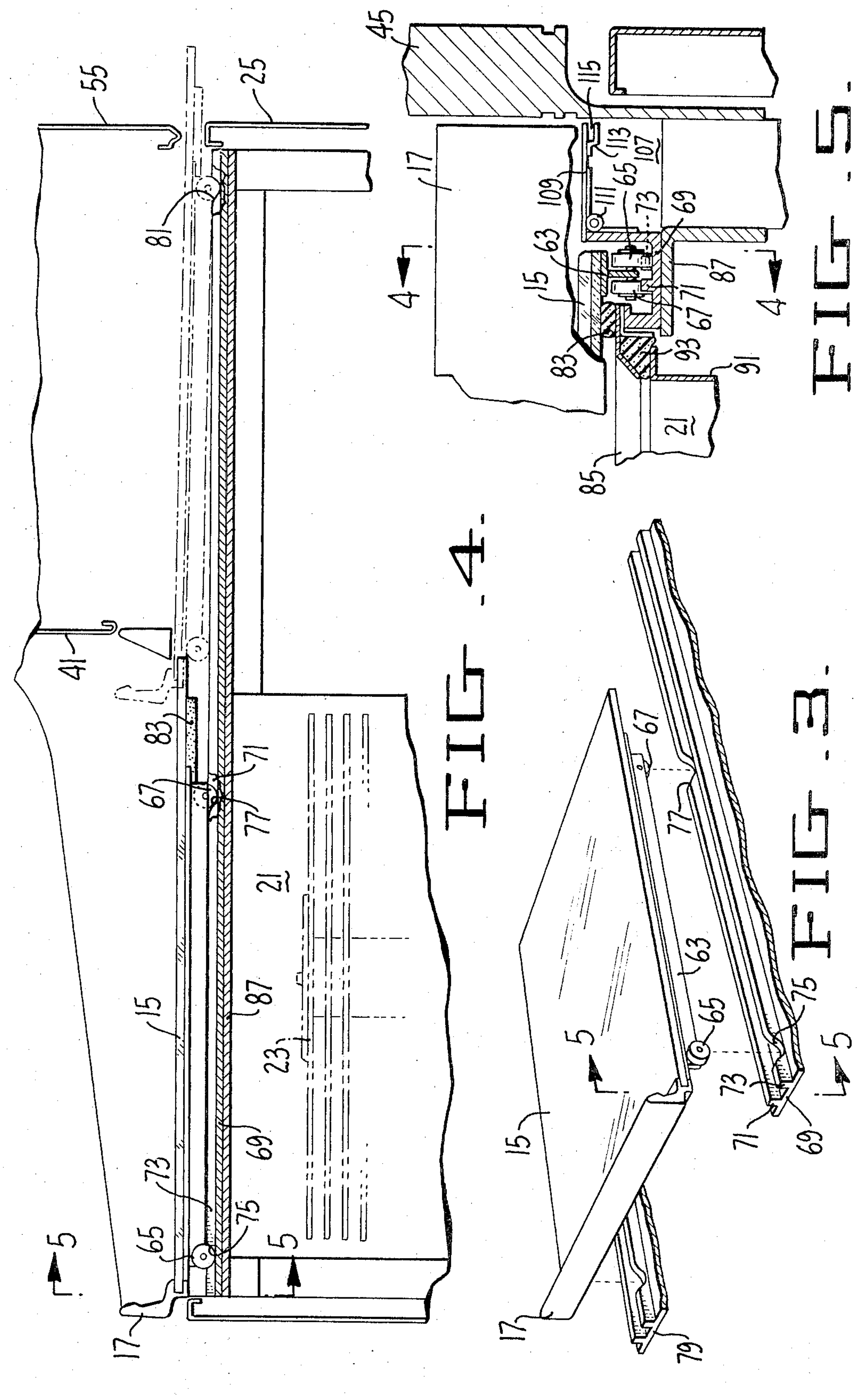
FIG. 3 is an exploded view of the top structure of one of the disc drive spindles of the module of FIG. 1.
FIG. 4 is a partially sectioned view of the cover assembly of one of the disc drive spindles of FIG. 1 taken across section 4—4 thereof.
FIG. 5 is a partially sectioned view of the cover assembly of a disc drive of FIG. 1 taken across section 5—5 of FIGS. 3 and 4.

Referring to FIG. 3, the opening structure for the glass cover 15 of the disc drive 13 is shown in perspective. On one side of the flat top 15 is attached a "T" bar 63 having a front wheel 65 rotatably attached thereto and a rear wheel 67 rotatably attached thereto. The wheels 65 and 67 are on opposite sides of the "T" bar 63 and are designed to cooperate with a track assembly 69 that is rigidly held on the top surface of the base structure of the disc pack 13. The track assembly 69 includes two tracks 71 and 73. The track 73 has a detent 75 near its front edge and positioned adjacent the front edge of the disc pack receptacle 19. The front wheel 65 of the cover rides on the track 73. The track 71 has a detent 77 a distance removed from its front end and adapted to receive the roller 67 of the cover. The detent 77 is located adjacent the rear edge of the opening 19.

A second track assembly 79 is similar to the track assembly 69 and is adapted to carry another set of rollers (not shown) on the opposite side of the glass cover 15 to the side which carries the rollers 65 and 67. All four rollers on the underside of the cover 15 ar adapted to drop in their respective exclusive detents at the same time as the cover 15 is positioned over the receptacle opening 19. By using a separate track for each roller on the cover, smooth action is assured since a given roller need not proceed through a detent designed to receive some other roller in the course of operating the cover between open and closed positions. Further more, the cover is prevented from sealing on the base structure at some position other than over the opening 19. Also, the abrupt make and brake of the seal prevents any sliding motion on the base structure, thereby preventing generation of undesirable particles from the sealing material that could interfer with the disc pack operation.

FIG. 4 shows in a partially sectioned side view operation of the cover 15 between its open and closed positions. The cover 15 is shown positioned over the disc pack receptacle 21 to seal it from the outside world for high precision operation of the mechanical elements therein. When the cover 15 is pushed backward to the dotted position shown in FIG. 4, the disc pack 23 may be removed from the receptacle 21. A rear detent 81 is provided in the track 71 to receive the rear wheel 67 of the cover to hold it in its open position. A similar detent is provided by the track on which the rear roller on the opposite side of the cover 15 rides. When the cover is in its open position shown in dotted outline in FIG. 4, it covers the access opening 47 of the top surface of the base structure of the disc drive 13 and even extends beyond its rear edge.

Referring primarily to FIG. 5, the structure whereby the cover 15 is sealed to the top of the base structure is shown. A plastic foam strip 83 is attached around the edge of the cover on its underside for sealing with a metal ring 85 which surrounds the top edge of the disc pack receptacle opening 19. The ring 85 is rigidly attached to the track assembly 69 which in turn is held by an angle bracket 87 which is attached to a side supporting member 89 of the base structure of the disc drive 13. When the cover 15 is in its closed position, the sealing strip 83 is compressed between the glass top 15 and the metal ring 85 to form an effective seal.

The disc pack receptacle 21 is formed by a cylindrically shaped shroud 91. The shroud 91 is connected to the track assembly 69 and the top ring 85 through a plastic foam shroud seal 93 that is in a ring-like shape held around the top edge of the shroud 91. The flexible seal 93 provides isolation from vibration generated from rotation of the disc pack within the shroud 91.

Figure 7:
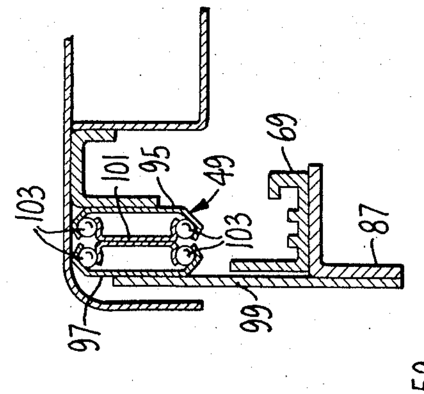
FIG. 7 is a sectional view of a portion of a disc drive spindle of FIG. 1 taken across section 7—7 of FIG. 6.

The track assembly is shown in detail in FIG. 7 and is substantially the same as that of the track assembly 51. The track assemblies 49 and 51 permit easy movement of the electronic assembly 33 to a forward position to permit access by a maintenance person to the interior of the base structure through the top opening 47. As shown in FIG. 7, a U-shaped bracket 95 is attached to the underside of the electronic assembly 33 while a similar U-shaped bracket 97 is attached to the base structure through a supporting member 99. Between the brackets 95 and 97 is an internal bracket 101 which is suspended between the brackets 95 and 97 by four sets of ball supports 103. The use of the ball rollers 103 results in the electronic assembly being easily slidable with respect to the base structure of the disc drive 13.

Figure 8:
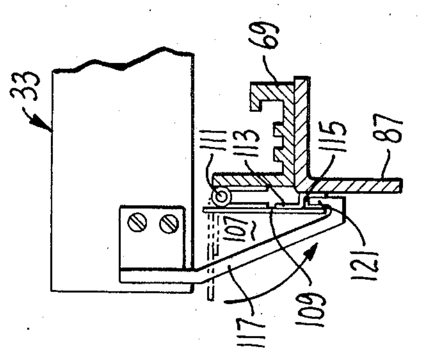
FIG. 8 is a sectional view of a portion of the disc drive structure of FIG. 1 taken across section 8—8 of FIG. 6.
Figure 6:
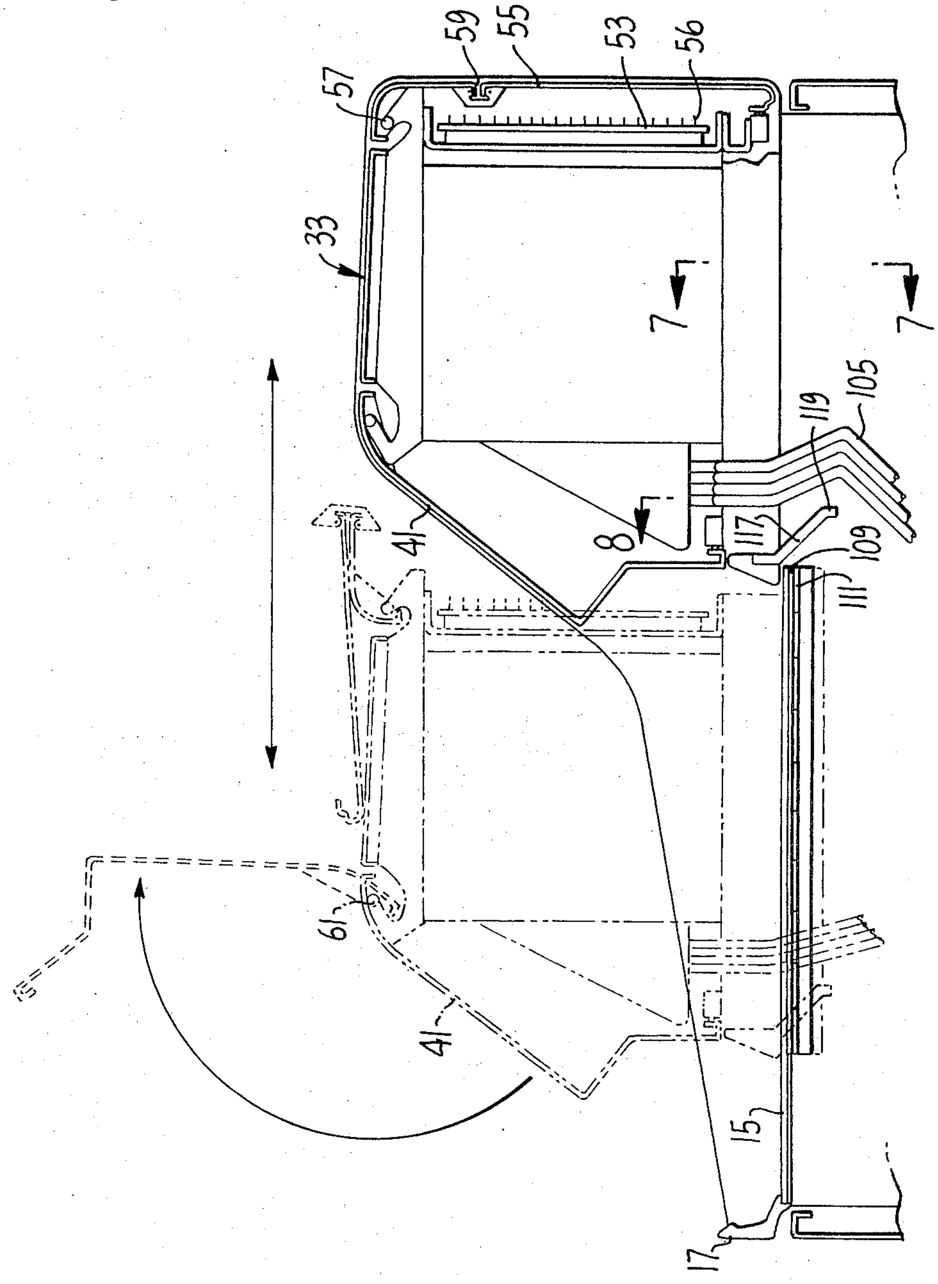
FIG. 6 is a partially sectioned view of a disc drive spindle of FIG. 1 taken across section 6—6 thereof.

As can be observed from FIG. 6, there are various cables 105 which interconnect the electronic assembly 33 with various components within the base structure of the disc drive 13. A problem exists in routing of the cables 105 in a manner to permit easy movement of the electronic assembly 33 to its forward position as shown in FIG. 2 and in dotted outline in FIG. 6. An additional set of cables (not shown) are provided on the opposite side of the electronic assembly 33 adjacent the second disc drive 11. In order to provide for these cables, elongated slots are provided in the top surface of the base structure of the disc drive 13 in which the cables may travel as the electronic assembly 33 is pushed forward. A slot 107 in which the cables 105 travel is shown in FIGS. 5 and 8. The slot 107 is on the outside of and immediately adjacent to the track assembly 69. A similar slot (not shown) is provided on the opposite side of the disc drive 13 on the outside of the track assembly 79. In order that the cable slots on the disc drive are covered when the electronic assembly 33 is in its normal position shown in FIG. 1, the slots are provided with a cover that serves normally as a portion of the top surface of the disc drive but which is moved out of the way as the electronic assembly 33 is moved forward.

For the slot 107, as shown best in FIGS. 5, 6 and 8, a deck panel 109 is provided as its cover. The panel 109 is held to the track assembly 69 by a spring hinge 111 which normally urges the deck panel 109 into a horizontal position shown in FIGS. 5 to cover the slot 107. A bracket 113 is provided on the underside of the deck panel 109 along its edge opposite to that attached to the hinge 111 in order to provide a slot 115 on the underside of the deck panel 109 and along its outside edge. A deck panel 116 (FIG. 1) of substantially the same construction is provided for the slot on the other side of the disc drive 13.

In order to open the slot 107 to receive the cables 105 as the electronic assembly 33 is pushed forward, a deck panel cam bar 117, shown in FIGS. 6 and 8, is rigidly attached to the underside of the electronic assembly 33 within the slot 107. The cam bar 117 is angled across the slot as shown in FIG. 8 in a manner that its top edge immediately adjacent the underside of the electronic assembly 33 first contacts the outside portion of the deck panel 109 opposite to that side connected to the hinge 111. The cam bar 117 is also sloped in a rearward direction as it extends below the electronic assembly 33 as shown in FIG. 6. As the electronic assembly 33 is pushed forward with respect to the base structure of the disc drive 13, the cam bar 117 contacts the end of the deck panel 109 in a manner to cause it to rotate about its hinge 111. When the electronic assembly 33 has been pushed forward far enough so that the outside edge of the deck panel 109 is contacting a lower end of the cam bar 117, the deck panel 109 is guided by the lower shape of the cam bar 117 until a vertical protrusion 121 thereof is inserted into the slot 115 beneath the surface of the deck panel 109. As the electronic assembly 33 is pushed forward an additional distance to the position in dotted outline of FIG. 6, the deck panel 109 is held in an open position by contact between the vertical protrusion 121 at the end of the cam bar 117 and the angle plate 113 that forms a slot 115 beneath the deck panel. This connection is shown in FIG. 8. A similar cam bar and relationship with the deck panel 116 is provided on the opposite side of the electronic assembly in order to open the second cable slot of the top surface of the bottom structure of the disc drive 13.

Although the various aspects of the present invention have been described with respect to a specific example thereof, it will be understood that the invention is entitled to protection within the full scope of the appended claims.

We claim:

1. A computer memory disc drive, comprising a base structure having a top surface extending between its front and rear and including an access opening in the top surface near the rear of the base portion to provide access to the interior of the base structure, an electronic assembly shaped to be carried by the base structure normally in a position over its top surface that covers said top access opening, means mounting said electronic assembly over the top surface of said base portion for permitting said electronic assembly to be moved between a normal position covering said top access opening and a position toward the forward edge of said base portion to expose the top opening for access therethrough;

a slot in said top surface extending in a direction between the front and rear of the base structure, a plurality of electrical cables interconnecting the base structure and the electronic assembly held in position to travel in said slot as the electronic assembly is moved forward relative to the top surface of the base structure, a pivotal deck panel resiliently held within said slot to normally form a portion of the top surface of the base structure, and means attached to and extending downward from said electronic assembly for pivoting said deck panel to expose said slot when the electronic assembly is moved forward relative to the top surface of said base structure, whereby said interconnecting cables may travel within said slot as the electronic assembly is moved forward while the deck panel covers the slot when the electronic assembly is in its normal position at the rear of said base structure.

2. The disc drive according to claim 1 wherein said pivotable deck panel includes an elongated rigid sheet held along one edge thereof to the base structure along the length of said slot by a hinge, and further wherein a spring is provided to normally position said deck panel to form a portion of said top surface.

3. The disc drive according to claim 2 wherein said pivoting means attached to the electronic assembly includes a rigid bar extending downward from the electronic assembly and angled across said slot in a manner that the upper portion of said bar adjacent said electronic assembly first contacts the side of said deck panel opposite to its side containing the hinge connection with the base structure in order to pivot the deck panel about said hinge against said spring, said bar further being sloped to the rear of said base structure from the top of the bar adjacent the electronic assembly to its bottom.

4. The disc drive according to claim 3 wherein said pivoting means additionally includes a vertical protrusion at a bottom end of said bar removed from said electronic assembly, and wherein said deck panel includes a slot at its edge opposite to that of the hinge and beneath its top surface for receiving said vertical protrusion as the electronic assembly is moved forward, whereby the deck panel may be held open to expose said slot to the cables without rubbing said bar against the deck plate top surface.

5. The disc drive according to claim 1 wherein said electronic assembly includes a printed circuit board connector assembly oriented with electrical test points positioned toward the rear of said base structure whereby test equipment may be connected to said pins by a maintenance man positioned at the rear of the base structure.

6. The disc drive according to claim 5 wherein said electronic assembly additionally includes a panel on its side facing toward the front of said base structure, said front panel including operating switches and visual indicators, at least a portion of said front panel additionally being mounted in a manner to be tiltable about its top edge to permit positioning the front panel indicators for observation from a position at the rear of the base structure.

7. The disc drive according to claim 6 wherein said electronic assembly additionally includes a panel on its surface toward the rear of said base structure that includes means for pivoting said rear panel about a top edge thereof over the top of said electronic assembly and additionally including means intermediate of the top edge and a bottom edge of the back panel for folding said panel over on itself to rest on the top of said electronic assembly without interfering with the visibility of the front panel indicators from the rear of said base structure.

8. A disc drive according to claim 1 which additionally comprises:

an opening of the top surface of the base structure forward of said access opening for receiving a disc pack into a receptacle, means within thhe base structure for rotating a disc pack that is positioned within said receptacle, a plurality of read/write heads held by the base structure for transferring information to and from the magnetic discs of said disc pack, and means located within the base structure beneath said top access opening for controlling the radial position of said read/write heads, whereby said controlling means is accessible for adjustment through the top opening of the base structure.

9. A disc drive according to claim 1 which additionally comprises:

a receptacle extending downward into the base structure through an opening of the top surface that is located forward of said top access opening, said receptacle for receiving a magnetic disc pack, and a cover for said disc pack receptacle that is slidable along the top surface of said base structure between extreme positions of covering said receptacle opening and exposing said receptacle opening while covering said access opening.

10. The disc drive of claim 9 which additionally comprises:

two pairs of tracks positioned on the top surface of the base structure, one pair on each side of said receptacle opening and extending generally in a direction between the front and rear of the base structure, one track of each pair having a roller receiving detent at its front adjacent a front edge of said receptacle opening and the other track of each pair containing a roller receiving detent adjacent a rear edge of said receptacle opening, two pair of rollers on said cover, one pair on each side, one roller of each pair positioned toward the front of the cover for riding along one of the tracks that has its detent positioned toward the front of said receptacle opening and a rear roller of each pair positioned toward the rear of said cover for riding along one of the tracks that has its detent positioned adjacent the rear of said receptacle opening, each of the detents and the rollers being positioned relative to one another so that the rollers simultaneously drop down into their respective detents to cover the receptacle opening, and a flexible sealing material held by the cover on its bottom surface and around its outside edge for sealing the cover to the base member when positioned over the receptcle opening.

11. A computer memory disc drive, comprising:
a base structure having beneath a top surface thereof a receptacle for receiving a magnetic disc pack,
means within the base structure for rotating the disc pack,
means within the base structure for positioning magnetic read/write heads within said receptacle in a radial position with respect to a rotating disc pack,
a power supply within the base structure,
said top surface of the base structure being provided with an opening adjacent its forward edge to said disc pack receptacle and an access opening toward the rear of said base structure above said read/-write positioning means,
an electronic assembly positioned over the top surface of said base structure, said electronic assembly including a front panel containing operating switches and indicators and a rear panel that opens to expose electrical test points within the electronic assembly for connection of test equipment from the rear of the base structure, said front panel of the electronic assembly being pivotably mounted at its top edge to permit tilting the front panel to a position that permits observing its indicators from the rear of the base structure, whereby maintenance may be performed from the rear of the base structure with the front panel indicators in full view,
means mounting said electronic assembly over the top surface of said base structure and normally positioned over said top access opening for permitting said electronic assembly to be moved forward away from said top access opening, whereby components within the base structure may be adjusted through said access opening.
one slot in said base structure top surface on each side of said receptacle opening and extending in a direction between the front and rear of said base structure,
one set of cables on each side of said electronic assembly for interconnecting said assembly to electrical components within the base structure, said cables being positioned to travel within said slots as the electronic assembly is moved forward along the top of said base structure,
a deck panel associated with each of said slots and covering at least a portion thereof, said deck panel being pivotably attached to said base structure along one edge of said slot and including a spring for normally holding said deck panel parallel with said top surface, and
means attached to and extending downward from opposite sides of said electronic assembly for pivoting the deck plates associated with each of the slots to expose the slots to said cable sets as said electronic assembly is moved forward with respect to the top surface of the base portion, whereby said interconnecting cables travel along said slots as said electronic assembly is moved forward and wherein the deck panel covers said slots when the electronic assembly is positioned over said top access opening.

12. The disc drive according to claim 11 wherein said pivoting means attached to the electronic assembly includes a rigid bar extending downward from each side of the electronic assembly and angled across said slot in a manner that the upper portion of each bar first contacts the side of its associated deck panel opposite to its side containing the hinge connection with the base structure in order to pivot the deck panel downward about said hinge, each of said bars further being sloped toward the rear of the base structure in a direction that the top of the bar adjacent the underside of the electronic assembly is the forward most portion of said bar.

13. A dis drive comprising:
a base structure having a top surface and a receptacle depending downward from an opening in said surface for receiving a magnetic recording disc pack,
one pair of tracks on each side of said receptacle opening, each of the four tracks being parallel to one another and extending generally in a direction between a front and rear of the base structure, one track of each pair having a detent adjacent a front edge of said receptacle opening and the other track having a detent adjacent the rear of said opening,
a generally flat cover adapted for covering said receptacle opening, said cover including a pair of rollers on each side thereof positioned so that one roller rides exclusively on one of said tracks, a forward roller on each side of said cover riding on the tracks having a detent adjacent the front edge of said receptacle opening while the rear rollers of said top riding on the tracks having the detents adjacent the rear edge of said receptacle opening, said detents and said rollers being positioned relative to one another so that all the rollers drop into the detents simultaneously as the cover is positioned over said receptacle opening, and
flexible sealing material attached to the cover on its underside and around its edges and adapted to seal the cover to said base structure around said receptacle opening when the cover is in its closed position with the rollers being received by their respective detents.

* * * * *